(12) United States Patent
Berstis et al.

(10) Patent No.: US 6,560,701 B1
(45) Date of Patent: May 6, 2003

(54) ALTERNATE BOOT RECORD

(75) Inventors: Viktors Berstis, Austin, TX (US); George Lee Fulk, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/797,076

(22) Filed: Feb. 10, 1997

(51) Int. Cl.[7] .............................................. G06F 9/445
(52) U.S. Cl. ........................................................ 713/2
(58) Field of Search ................................ 395/651, 652; 713/1, 2; 714/55

(56) References Cited

U.S. PATENT DOCUMENTS

| 4,827,462 | A |   | 5/1989  | Flannagan et al. ............ 369/32  |
|-----------|---|---|---------|--------------------------------------|
| 5,022,077 | A |   | 6/1991  | Bealkowski et al. ........... 380/4   |
| 5,128,995 | A |   | 7/1992  | Arnold et al. .................. 380/4 |
| 5,214,695 | A |   | 5/1993  | Arnold et al. .................. 380/4 |
| 5,390,324 | A | * | 2/1995  | Burckhartt et al. ............ 714/55 |
| 5,537,540 | A |   | 7/1996  | Miller et al. ............ 395/183.14 |
| 5,537,636 | A |   | 7/1996  | Uchida et al. ............... 395/600 |
| 5,564,054 | A | * | 10/1996 | Bramnick et al. .......... 395/652    |
| 5,568,641 | A | * | 10/1996 | Nelson et al. ............... 395/652 |
| 5,579,522 | A | * | 11/1996 | Christeson et al. .......... 395/652  |
| 5,708,776 | A | * | 1/1998  | Kikinis ...................... 714/55 X |
| 5,735,882 | A | * | 4/1998  | Rottenberg et al. ............ 607/27 |
| 5,805,882 | A | * | 9/1998  | Cooper et al. ............... 395/652 |

FOREIGN PATENT DOCUMENTS

| JP | 2-186426   | 7/1990  | ............ G06F/3/06  |
| JP | 4-354029   | 12/1992 | ............ G06F/9/445 |
| JP | 5-119928   | 5/1993  | ............ G06F/3/06  |
| WO | WO 95/22794 | 8/1995 | ............ G06F/11/14 |

* cited by examiner

Primary Examiner—Thomas M. Heckler
(74) Attorney, Agent, or Firm—Jeffrey S. LaBaw; Bracewell & Patterson, L.L.P.

(57) ABSTRACT

An alternate boot record is stored on a hard disk drive in a data processing system at the opposite end of the hard disk from a master boot record. Extended boot records stored before each logical partition are employed for that partition when the master boot record or alternate boot record is utilized for system initialization. The alternate boot record is utilized to initialize the data processing system when attempts to initialize the data processing system utilizing the master boot record are unsuccessful. The alternate boot record thus forms part of an automatic recovery mechanism in the data processing system.

12 Claims, 9 Drawing Sheets

ALTERNATE BOOT RECORD

BACKGROUND OF THE INVENTION

1. Technical Field

The present invention relates in general to data processing systems and in particular to system initialization mechanisms for data processing systems. Still more particularly, the present invention relates to a system initialization or boot mechanism for data processing systems which facilitates system recovery and/or self-repair.

2. Description of the Related Art

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Operating costs may be reduced by providing informational guides and/or searchable databases of public records online.

The largest segment of the consuming public does not currently have access to these resources. Such consumers are typically either unable or unmotivated to acquire both the requisite hardware and software and the necessary computer skills for taking advantage of these resources. There is a need for low cost data processing systems which are simple to operate, allowing users without computer skills the opportunity to access the Internet. This need is being addressed, to some extent, by "set-top-box" systems.

In designing a low cost, simple data processing system, however, it is necessary to presume that the target user is unsophisticated and/or inexperienced. Therefore the operation of the data processing system must be both simple and intuitive, requiring little or no technical sophistication on the part of the user. In this regard, it would be advantageous to provide the data processing system with a mechanism for self-analysis and, if possible, self-recovery. The data processing system should operate as much as possible like an appliance, notifying a user of unrecoverable malfunctions which require service. It would also be desirable to provide a mechanism for automatic self-recovery where possible. The mechanism employed should not add significantly to the cost of the data processing system and should conform, as much as possible, to existing data processing system standards.

SUMMARY OF THE INVENTION

It is therefore one object of the present invention to provide an improved data processing system.

It is another object of the present invention to provide an improved system initialization mechanism for data processing systems.

It is yet another object of the present invention to provide a system initialization or boot mechanism for data processing systems which facilitates system recovery and/or self-repair.

The foregoing objects are achieved as is now described. An alternate boot record is stored on a hard disk drive in a data processing system at the opposite end of the hard disk from a master boot record. Extended boot records stored before each logical partition are employed for that partition when the master boot record or alternate boot record is utilized for system initialization. The alternate boot record is utilized to initialize the data processing system when attempts to initialize the data processing system utilizing the master boot record are unsuccessful. The alternate boot record thus forms part of an automatic recovery mechanism in the data processing system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1A:
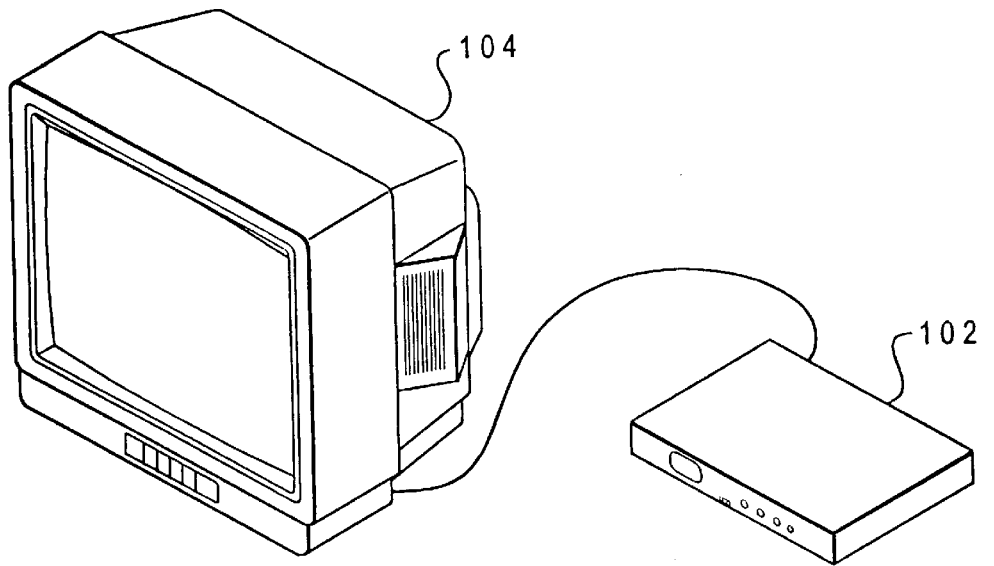
FIGS. 1A–1D depicts various pictorial representations of a data processing system in which a preferred embodiment of the present invention may be implemented.

With reference now to the figures, and in particular with reference to FIGS. 1A through 1D, various pictorial representations of a data processing system in which a preferred embodiment of the present invention may be implemented are depicted. FIG. 1A is a pictorial representation of the data processing system as a whole. Data processing system 100 in the depicted example provides, with minimal economic costs for hardware to the user, access to the Internet. Data processing system 100 includes a data processing unit 102. Data processing unit 102 is preferably sized to fit in typical entertainment centers and provides all required functionality, conventionally found in personal computers, to enable a user to "browse" the Internet. Additionally, data processing unit 102 may provide other common functions such as, for example, serving as an answering machine, transmitting or receiving facsimile transmissions, or providing voice mail facilities.

Data processing unit 102 is connected to television 104 for display of graphical information. Television 104 may be any suitable television, although color televisions with an S-Video input will provide better presentations of the graphical information. Data processing unit 102 may be connected to television 104 through a standard coaxial cable connection. A remote control unit 106 allows a user to interact with and control data processing unit 102. Remote control unit 106 emits infrared (IR) signals, preferably modulated at a different frequency than the normal television, stereo, and VCR infrared remote control frequencies in order to avoid interference. Remote control unit 106 provides the functionality of a pointing device in conventional personal computers, including the ability to move a cursor on a display and select items.

Figure 1D:
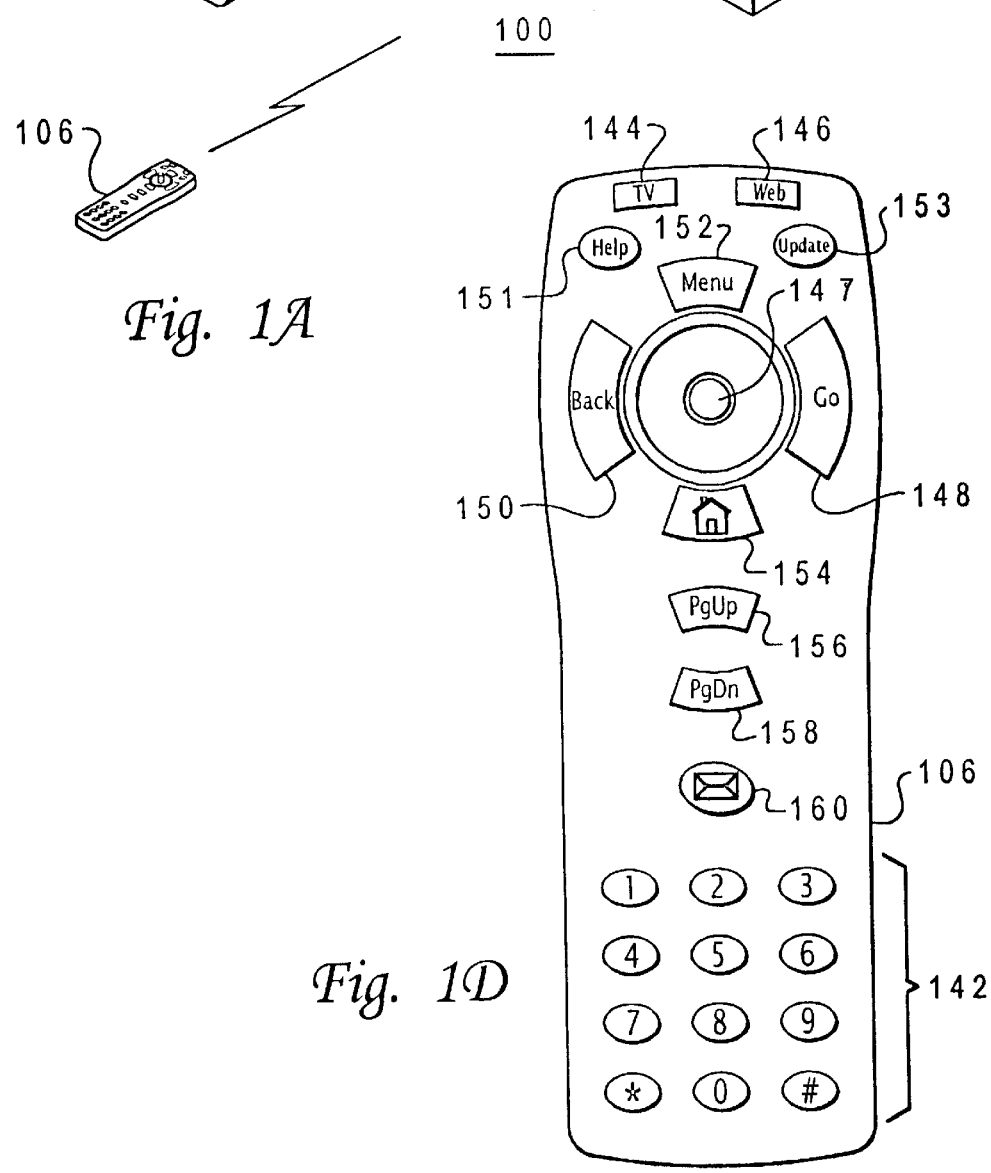
Figure 1B:
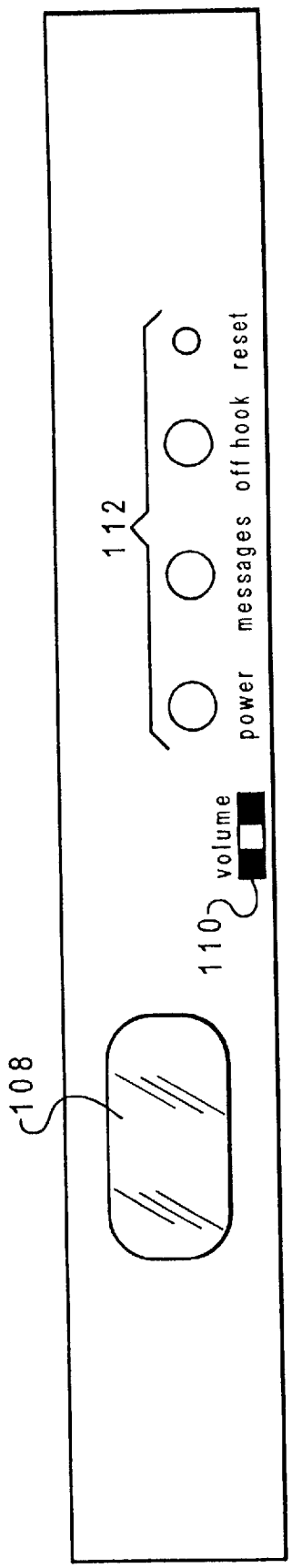

FIG. 1B is a pictorial representation of the front panel of data processing unit 102 in accordance with a preferred embodiment of the present invention. The front panel includes an infrared window 108 for receiving signals from remote control unit 106 and for transmitting infrared signals. Data processing unit 102 may transmit infrared signals to be reflected off objects or surfaces, allowing data processing unit 102 to automatically control television 104. Volume control 110 permits adjustment of the sound level emanating from a speaker within data processing unit 102 or from television 104. A plurality of light-emitting diode (LED) indicators 112 provide an indication to the user of when data processing unit 102 is on, whether the user has messages, whether the modem/phone line is in use, or whether data processing unit 102 requires service.

Figure 1C:
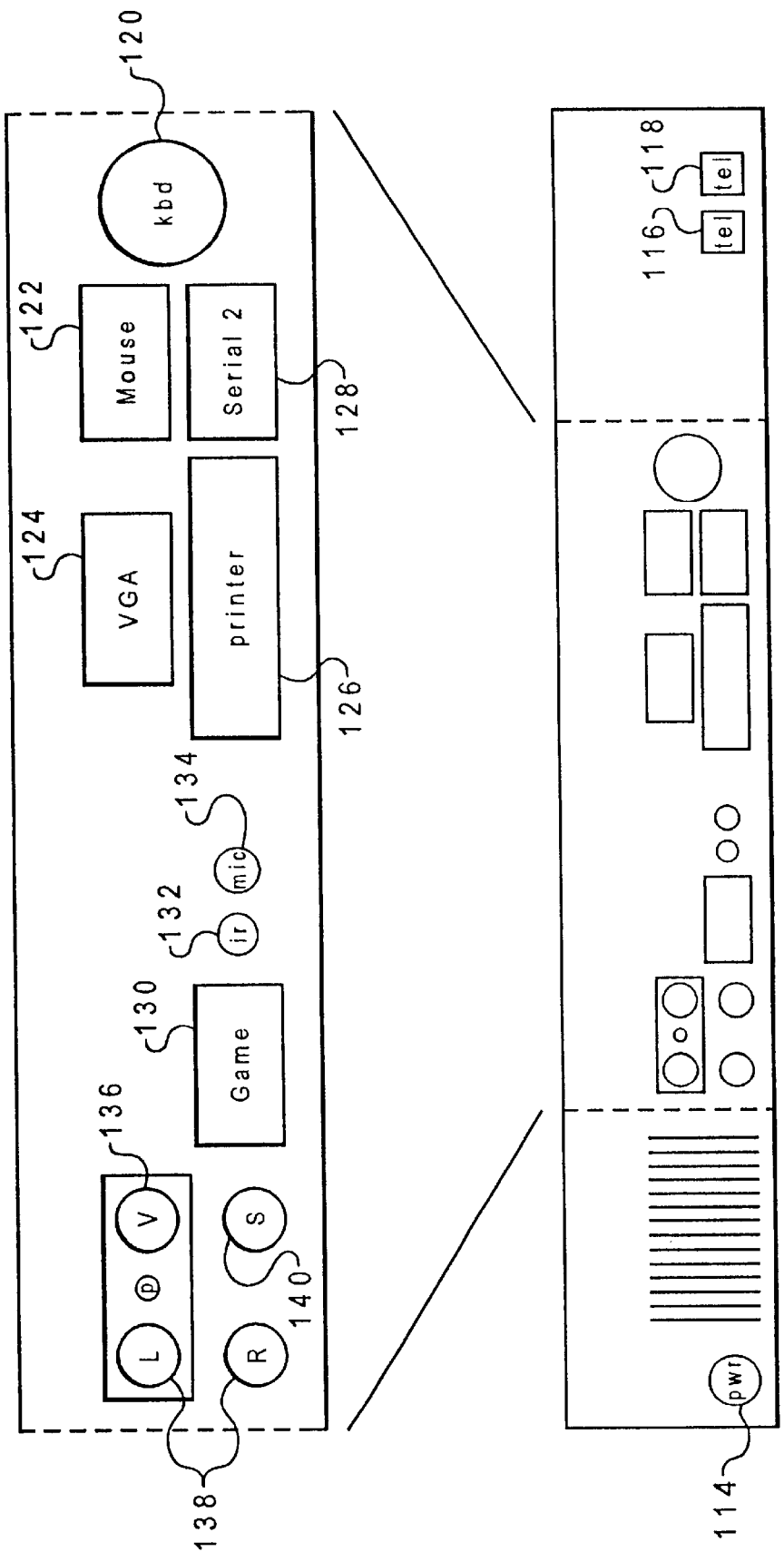

FIG. 1C is a pictorial representation of the rear panel of data processing unit 102 in accordance with a preferred embodiment of the present invention. A three wire (ground included) insulated power cord 114 passes through the rear panel. Standard telephone jacks 116 and 118 on the rear panel provide an input to a modem from the phone line and an output to a handset (not shown). The rear panel also provides a standard computer keyboard connection 120, mouse port 122, computer monitor port 124, printer port 126, and an additional serial port 128. These connections may be employed to allow data processing unit 102 to operate in the manner of a conventional personal computer. Game port 130 on the rear panel provides a connection for a joystick or other gaming control device (glove, etc.). Infrared extension jack 132 allows a cabled infrared LED to be utilized to transmit infrared signals. Microphone jack 134 allows an external microphone to be connected to data processing unit 102.

Video connection 136, a standard coaxial cable connector, connects to the video-in terminal of television 104 or a video cassette recorder (not shown). Left and right audio jacks 138 connect to the corresponding audio-in connectors on television 104 or to a stereo (not shown). If the user has S-Video input, then S-Video connection 140 may be used to connect to television 104 to provide a better picture than the composite signal. If television 104 has no video inputs, an external channel 3/4 modulator (not shown) may be connected in-line with the antenna connection.

FIG. 1D is a pictorial representation of remote control unit 106 in accordance with a preferred embodiment of the present invention. Similar to a standard telephone keypad, remote control unit 106 includes buttons 142 for arabic numerals 0 through 9, the asterisk or "star" symbol (*), and the pound sign (#). Remote control unit also includes "TV" button 144 for selectively viewing television broadcasts and "Web" button 146 for initiating "browsing" of the Internet. A pointing device, which is preferably a trackpoint or "button" pointing device, is included on remote control unit 106 and allows a user to manipulate a cursor on the display of television 104. "Go" and "Back" buttons 148 and 150, respectively, allow a user to select an option or return to a previous selection. "Menu" button 152 causes a context-sensitive menu of options to be displayed, while home button 154 allows to user to return to a default display of options. "PgUp" and "PgDn" buttons 156 and 158 allows the user to change the content of the display in display-sized blocks rather than by scrolling. The message button 160 allows the user to retrieve messages. In addition to, or in lieu of, remote control unit 106, an infrared keyboard (not shown) with an integral pointing device may be used to control data processing unit 102. The integral pointing device is preferably a trackpoint or button type of pointing device. A wired keyboard (also not shown) may also be used through keyboard connection 120, and a wired pointing device such as a mouse or trackball may be used through mouse port 122. When a user has one or more of the remote control unit 106, infrared keyboard, wired keyboard and/or wired pointing device operable, the active device locks out all others until a prescribed period of inactivity has passed.

Figure 2:
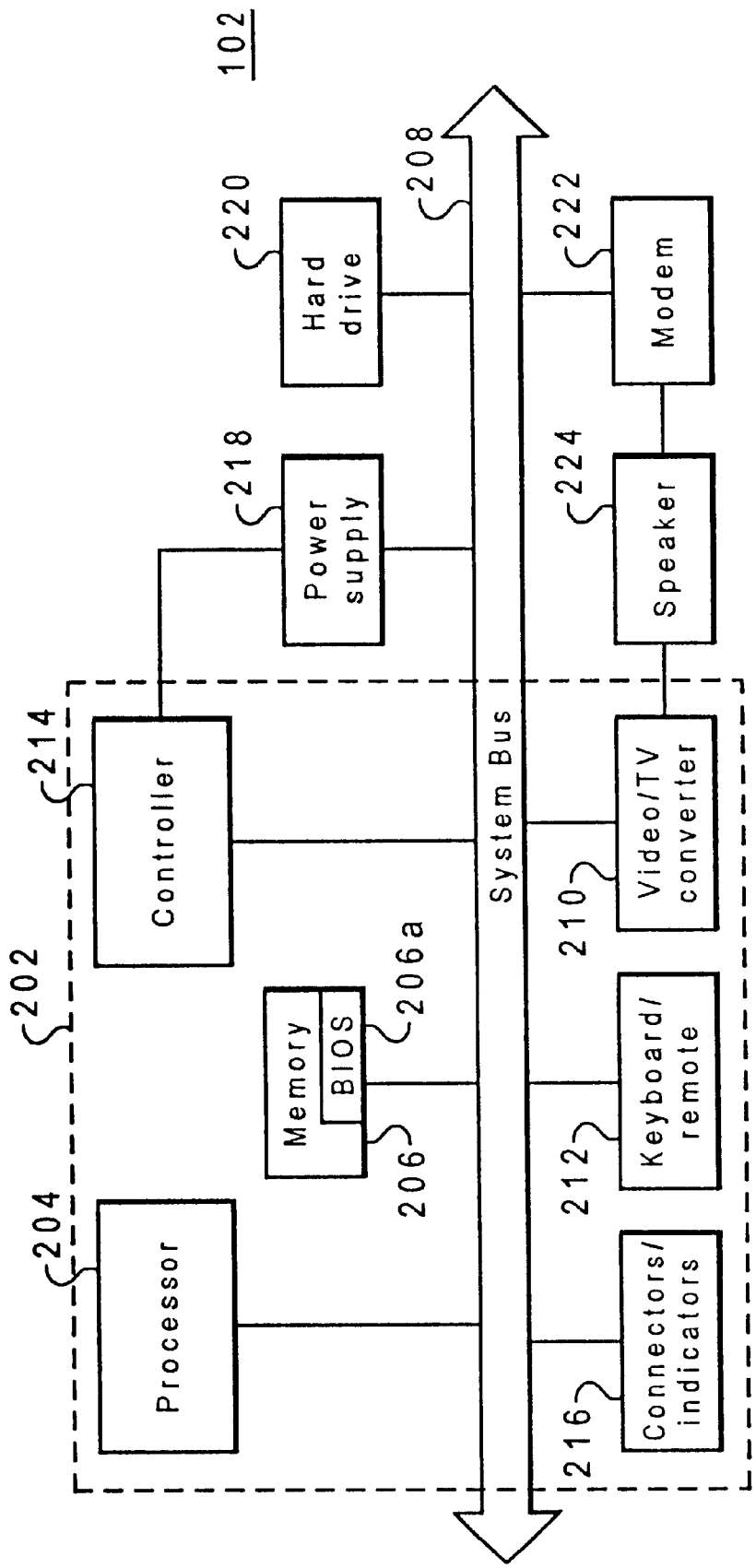
FIG. 2 is a block diagram for the major components of data processing unit in accordance with a preferred embodiment of the present invention.

Referring now to FIG. 2, a block diagram for the major components of data processing unit 102 in accordance with a preferred embodiment of the present invention is portrayed. As with conventional personal computers, data processing unit 102 includes a motherboard 202 containing a processor 204 and memory 206 connected to system bus 208. Processor 205 is preferably at least a 486 processor operating at or above 100 MHz. Memory 206 includes read only memory (ROM) 206a containing a basic input/output services (BIOS) routine and may include cache memory and/or video RAM.

Video/TV converter 210 on motherboard 202 and connected to system bus 208 generates computer video signals for computer monitors, a composite television signal, and an S-Video signal. The functionality of video/TV converter 210 may be provided utilizing commercially available video and converter chips. Keyboard/remote control interface unit 212 on motherboard 202 receives keyboard codes through controller 214, regardless of whether a wired keyboard/pointing device or an infrared keyboard/remote control is being employed. Infrared remote control unit 106 transmits signals which are ultimately sent to the serial port as control signals generated by conventional mouse or pointing device movements. Two buttons on remote control unit 106 are interpreted identically to the two buttons on a conventional mouse, while the remainder of the buttons transmit signals corresponding to keystrokes on an infrared keyboard. Thus, remote control unit 106 has a subset of the functions provided by an infrared keyboard. Connectors/indicators 216 on motherboard 202 provide the connections and indicators on data processing unit 102 described above.

External to motherboard 202 in the depicted example are power supply 218, hard drive 220, modem 222, and speaker 224. Power supply 218 is a conventional power supply except that it receives a control signal from controller 214 which effects shut down of all power to motherboard 202, hard drive 220, and modem 222. In some recovery situations, removing power and rebooting is the only guaranteed method of resetting all of these devices to a known state. Thus power supply 218, in response to a signal from controller 214, is capable of powering down and restarting data processing unit 102.

Hard drive 220 contains operating system and applications software for data processing unit 102, which preferably includes: IBM DOS 7.0, a product of International Business Machines Corporation in Armonk, N.Y.; Windows 3.1, a product Microsoft Corporation in Redmond, Wash.; and Netscape Navigator, a product of Netscape Communications Corporation in Mountain View, Calif. Data may also be stored on hard drive 220. Modem 222, inserted into a slot mounted sideways on motherboard 202, is preferably a 33.6 kbps modem supporting the V.42bis, V34bis, V.34, V.17 Fax, MNP 1-5, and AT command sets.

Controller 214 is preferably one or more of the 805x family controllers. Controller 214 is continuously powered and, when data processing unit 102 is turned on, monitors the system for a periodic "ping" indicating that data processing unit 102 is operating normally. In the event that controller 214 does not receive a ping within a prescribed timeout period, controller 214 removes power from the system and restarts the system. This may be necessary, for example, when the system experiences a general protection fault. If multiple attempts to restart the system prove unsuccessful, controller 214 shuts off data processing unit 102 and signals that service is required through indicators 216. Thus, data processing unit 102 is capable of self-recovery in some circumstances without involvement by a user.

Controller 214 also receives and processes input from infrared remote control 106, infrared keyboard; wired keyboard, or wired mouse. When one keyboard or pointing device is used, all others are locked out (ignored) until none have been active for a prescribed period. Then the first keyboard or pointing device to generate activity locks out all others. Controller 214 also directly controls all LED indicators except that indicating modem use and specifies the boot sector selection during any power off-on cycle.

Those skilled in the art will recognize that the components depicted in FIGS. 1A–1D and 2 and described above may be varied for specific applications or embodiments. Such variations in which the present invention may be implemented are considered to be within the spirit and scope of the present invention.

Figure 3A:
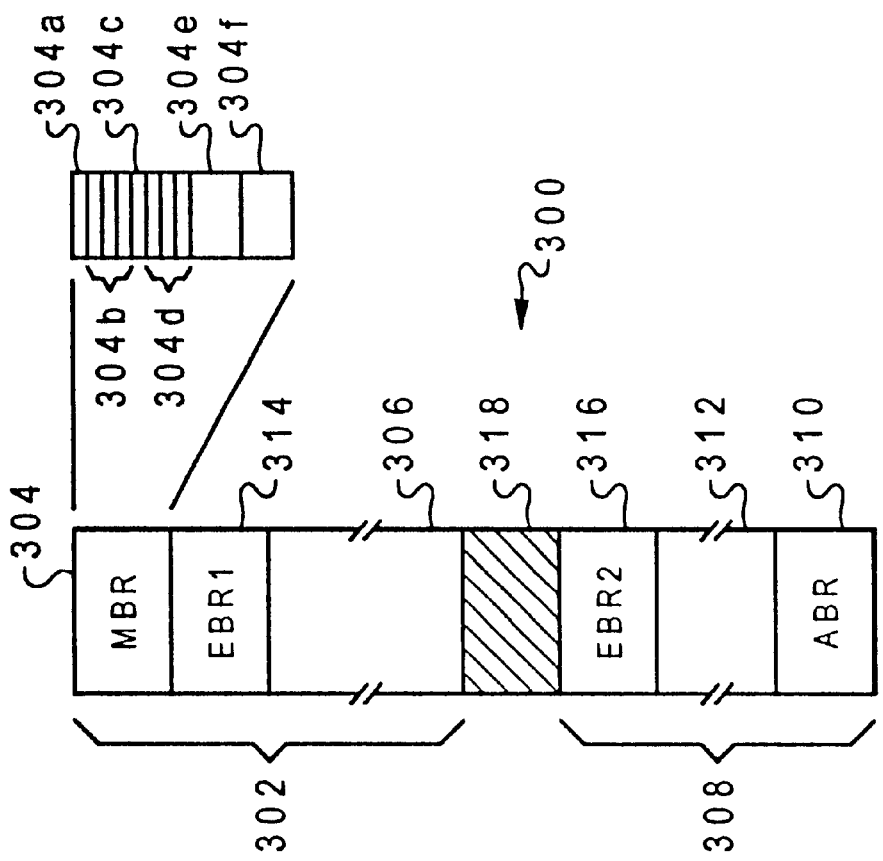
FIGS. 3A–3C depict diagrams of a data format of a hard disk drive in accordance with a preferred embodiment of the present invention.

With reference now to FIG. 3A, a diagram of a data format of hard disk drive 220 in accordance with a preferred embodiment of the present invention is depicted. As with conventional hard drive formats, format 300 includes a first portion 302 having a partition record or boot record 304 and file space 306. Boot record 304 contains sixteen bytes including a boot indicator or partition flag 304a indicating whether the partition is primary or extended, pointers to the partition start head, sector, and track 304b, an operating system indicator 304c, pointers to the partition end head, sector, and track 304d, a number of logical sectors preceding the partition 304e, and a length of the partition in sectors 304f. Each hard disk contains a master boot record, which defines a primary partition and an extended partition in the disk space. The extended partition contains an extended boot record, which may further divide the file space of the extended partition into separate logical partitions.

In the present invention, boot record 304 in the first portion 302 is designated the master boot record ("MBR"). Master boot record 304 is employed when the data processing system boots from first portion 302. Master boot record 304 may be either a fast or slow boot, depending on practical considerations. Master boot record 304 defines file space 306 as the primary partition, and file space 312 and extended boot record 316 as the extended partition. Extended boot record 316 defines file space 312 as a single logical partition. Alternate boot record 310 and extended boot record 314 appear simply as unused disk space when master boot record 304 is employed.

Format 300 also includes a second portion 308 containing an alternate boot record 310 and file space 312. Alternate boot record 310 is utilized when the data processing system boots from second portion 308 as described below. Alternate boot record 310 defines file space 312 as the primary partition and file space 306 and extended boot record 314 as the extended partition. Extended boot record 314 defines file space 306 as a single logical partition.

Second portion 308 may be smaller than first portion 302, or may optionally be equal in size or larger. Each portion 302 and 308 also includes an extended boot record 314 and 316, respectively, which comprise the sixteen bytes described above in connection with boot record 304. Format 300 may optionally also include unallocated portion 318.

Under the disk operating system (DOS), boot records have an absolute location on the disk. Master boot record 304 is located at track or cylinder 0, head 0, sector 1, at the beginning of the disk space. Alternate boot record 310 is located at track n, head 0, sector 1, at the end of the disk space for a disk having n cylinders. Extended boot record 314 immediately follows the master boot record 304, while extended boot record 316 is located at the beginning of second portion 308, following the convention that the boot record is located in the first sector of the partition.

The data processing system may boot from either master boot record 304 in first portion 302 or alternate boot record 310 in second portion 308.

When booting from master boot record 304, master boot record 304 is utilized. File space 306 is set as the primary partition and named C:. Extended boot record 316 is utilized for the extended partition, comprising file space 312 and extended boot record 316, which is named D:. When booting from alternate boot record 310, alternate boot record 310 is utilized, with file space 312 set as the primary partition and named C:. Extended boot record 314 is utilized for the extended partition, comprising file space 306 and extended boot record 314, which is named D:.

Both file spaces 306 and 312 contain a copy of the operating system utilized by the data processing system, enabling the data processing system to boot from either partition. However, the version of the operating system stored in file space 312 of second portion 308 is slightly modified from typical commercial versions. The load track number of the operating system copy stored on second portion 308 points to the largest track number rather than to the first track, so that alternate boot record 310 is loaded. Additionally, most DOS-based operating systems require the operating system to boot from the first partition of the first hard drive, which is designated as the primary partition of what is designated as the C: drive. Therefore, if a DOS-based operating system is employed, the operating system must be modified to permit the system to boot from a partition other than the first partition. The operating system may optionally be further modified to permit the system to boot off a non-C: drive.

DOS operating systems typically contain three files, sometimes named differently in different versions: IBM-BIO.COM or IO.SYS, IBMDOS.COM or MSDOS.SYS, and COMMAND.COM. The modifications described above may be effected by changing only a few lines of IBMBIO. COM. Other operating systems may require similar modifications.

Unallocated space 318 may be included in format 300 to offset inefficiencies in the file allocation table (FAT) file system employed by DOS. Like other file systems, the FAT file system requires a minimum allocation space per file which changes depending on the total disk space allocated.

Figure 3B:
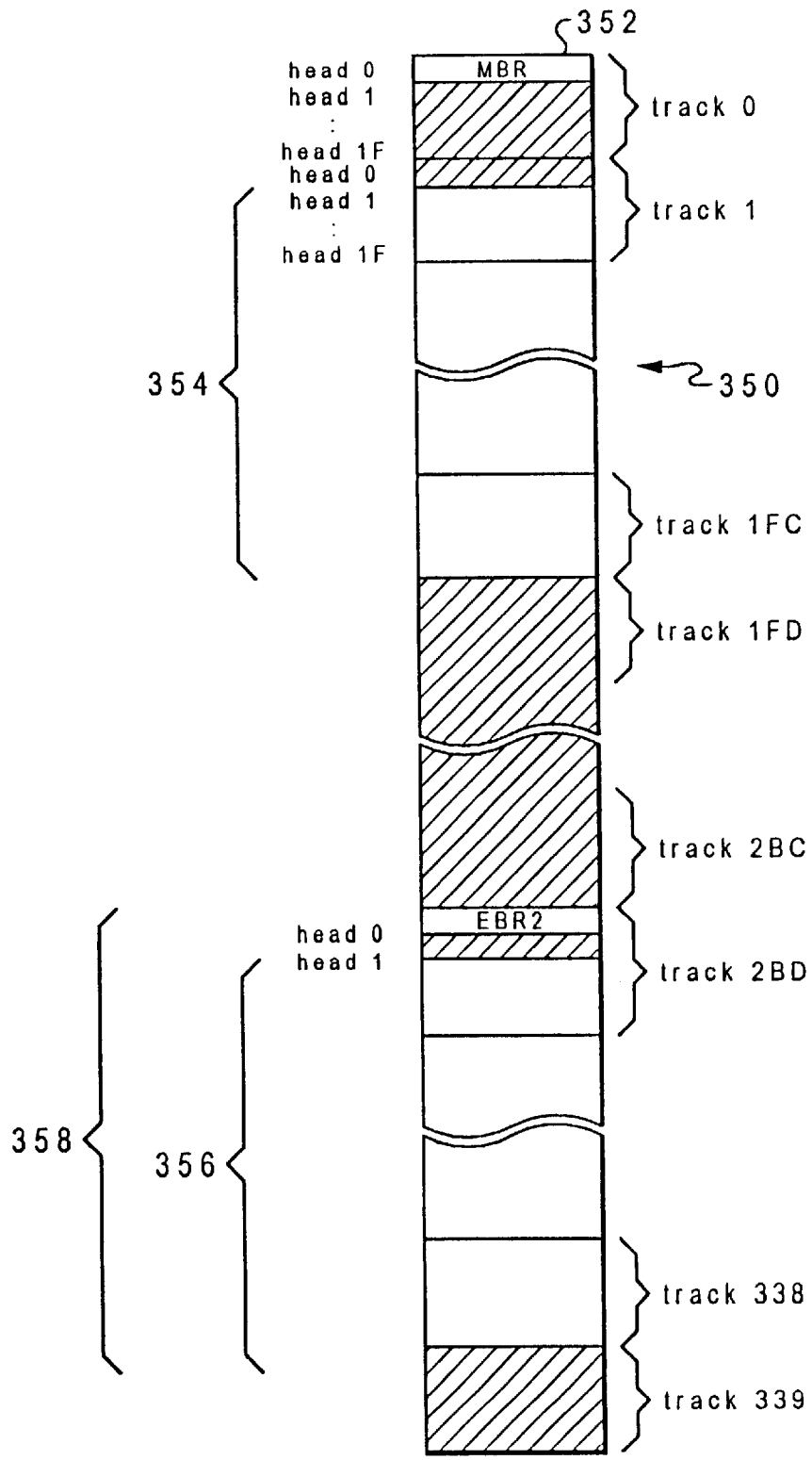
Figure 3C:
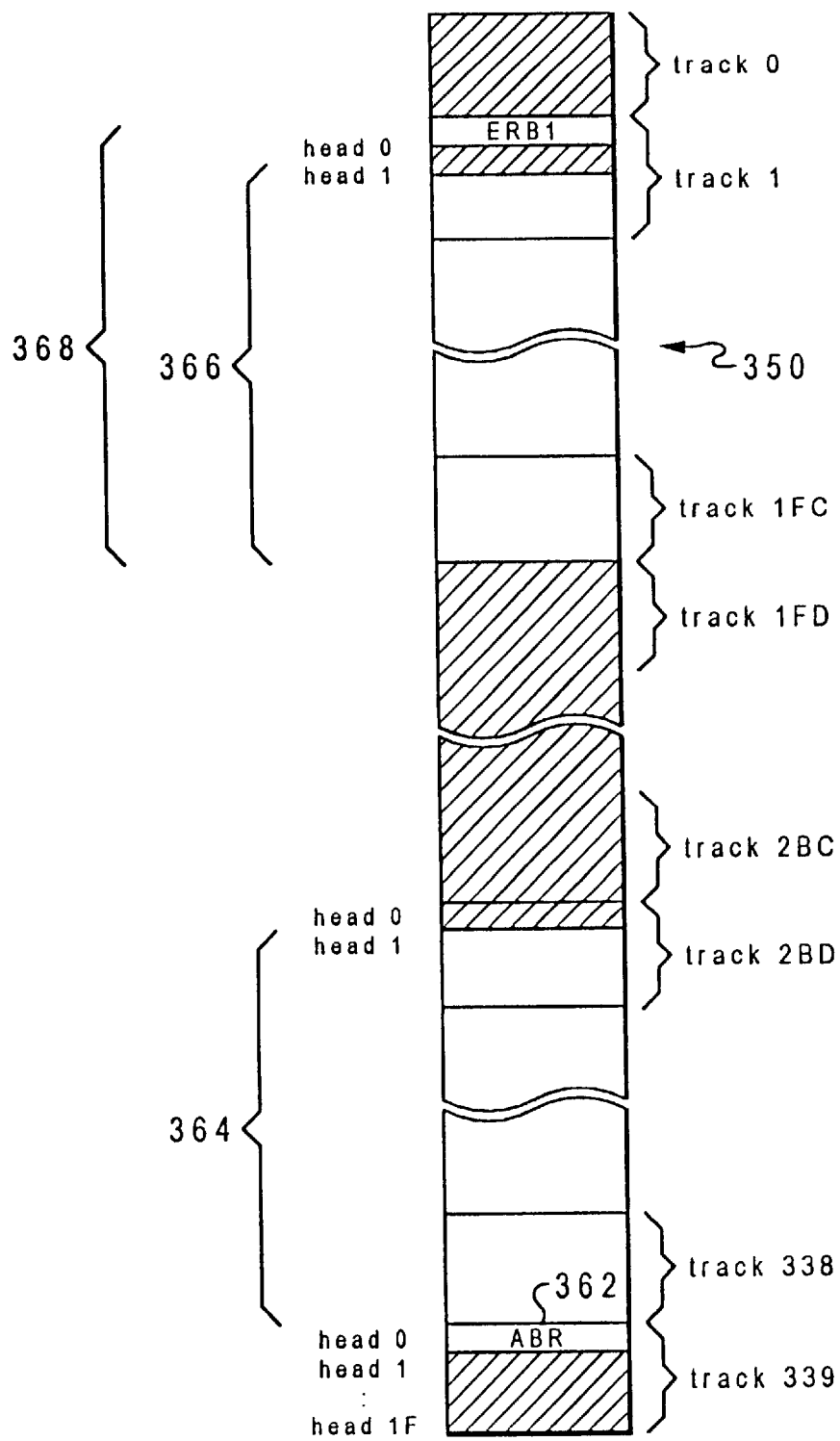

As a specific example, FIGS. 3B and 3C depict the system view of an 813 megabyte hard disk drive when the system is booted with the master boot record or with the alternate boot record. The 813 MB disk has (all number is hexadecimal):

heads ϵ[0, 1F]
sectors ϵ[1, 3F]
tracks ϵ[0, 339].

The head, sector, track (HST) of the master boot record (MBR), alternate boot record (ABR), first extended boot record (EBR1), and second extended boot record (EBR2) are as follows:

MBR is one sector stored at HST=0, 1, 0 with two entries:

| HST = 1, 1, 1 → 1F, 3F, 1FC | type = primary | flag = bootable |
|---|---|---|
| HST = 0, 1, 2BD → 1F, 3F, 338 | type = extended | |

ABR is one sector of data stored at HST=0, 1, 339 with two entries:

| HST = 1, 1, 2BD → 1F, 3F, 338 | type = primary | flag = bootable |
|---|---|---|
| HST = 0, 1, 1 → 1F, 3F, 1FC | type = extended | |

EBR1 is one sector of data stored at HST=0, 1, 1 with one entry:

| HST = 1, 1, 1 → 1F, 3F, 1FC | type = logical |
|---|---|

EBR2 is one sector of data stored at HST=0, 1, 2BD with one entry:

| HST = 1, 1, 2BD → 1F, 3F, 338 | type = logical |
|---|---|

FIG. 3B depicts the system view of the disk space 350 when the system is booted from master boot record 352. Primary partition 354 is assigned the drive letter C:, while logical partition 356 within extended partition 358 is assigned the drive letter D:. FIG. 3C depicts the system view of the disk space 350 when the system is booted from alternate boot record 362. Primary partition 364 is assigned the drive letter C:, while logical partition 366 within extended partition 368 is assigned the drive letter D:.

Referring again to FIG. 2, during system initialization, system BIOS 206*a* loads one sector of code and transfers control to that code. The sector of code which is loaded depends on whether the system is booting from the master boot record or the alternate boot record. When the point is reached during initialization when the boot record is to be loaded, system BIOS 206*a* queries controller 214 as to which boot record to boot from. Controller 214 returns a pointer pointing to either the master boot record or the alternate boot record based on the state of registers within controller 214.

Figure 4A:
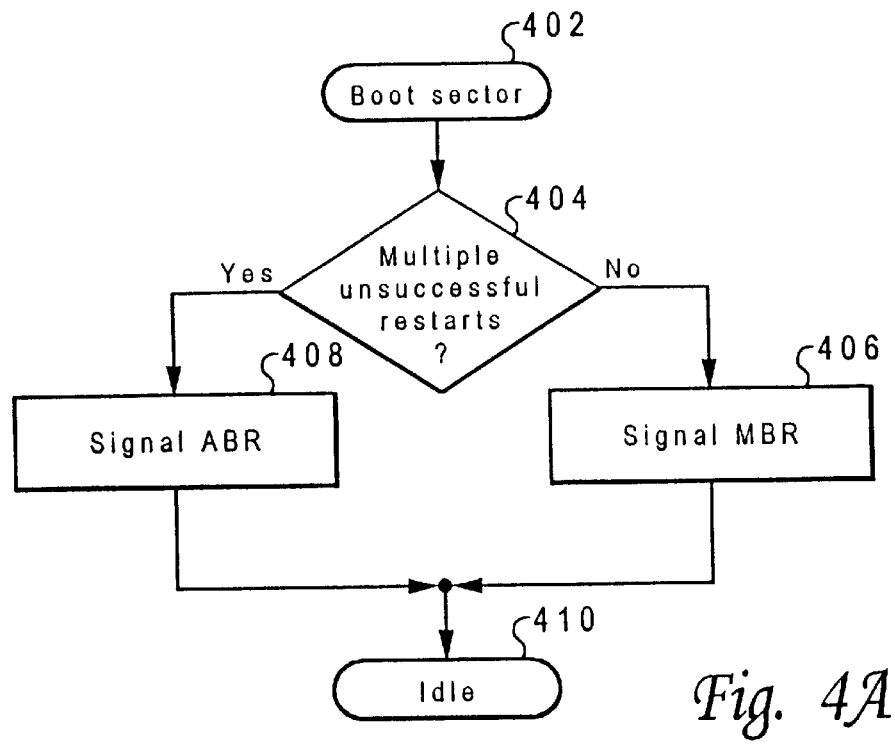
FIGS. 4A and 4B are high level flowcharts for complementary processed for determining whether to boot from the master boot record or the alternate boot record of a hard drive and booting from either the master boot record or the alternate boot record in accordance with a preferred embodiment of the present invention.
Figure 4B:
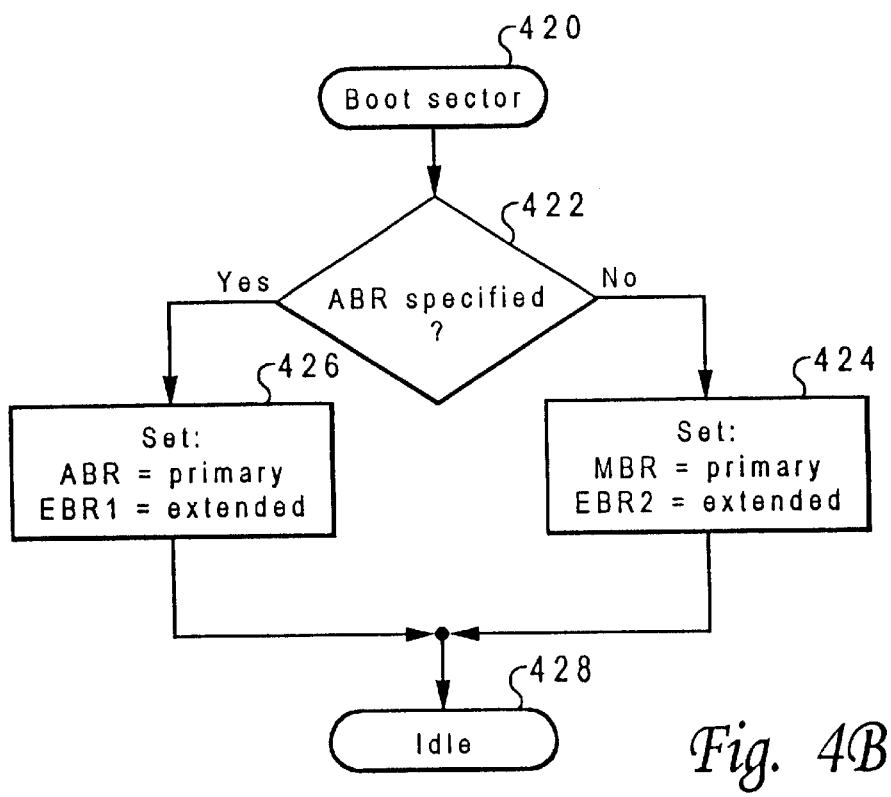

Referring to FIGS. 4A and 4B, high level flowcharts for complementary processes for determining whether employ the master boot record or the alternate boot record of a hard drive during initialization and for initializing from either boot record in accordance with a preferred embodiment of the present invention are portrayed.

FIG. 4A illustrates the process for determining whether to employ the master boot record or the alternate boot record. The process begins at step 402, which depicts receipt of a query from the system BIOS regarding which boot record to utilize. The process then passes to step 404, which illustrates a determination of whether the system has unsuccessfully attempted to restart multiple times (i.e., at least more than once, although other thresholds may be employed). If not, the process proceeds to step 406, which depicts signaling the system BIOS to employ the master boot record. The master boot record will be utilized when the system is started by the user after having been off and if the system is restarting after an interruption in normal operations. Even if the controller initiated system start-up as part of self-recovery efforts, the controller will attempt to restart the system normally utilizing the master boot record. Only if multiple attempts to restart the system prove futile will the system attempt to boot from the alternate boot record.

If multiple attempts have failed to restart the system, the process passes to step 408, which depicts signaling the system BIOS to employ the alternate boot record. This may be necessary, for example, if the master boot record becomes corrupt. After the system is successfully initialized from the alternate boot record, diagnostic tools may be automatically loaded by the operating system to repair the master boot record if necessary. Such diagnostic and repair utilities are conventional within the art and need not be described further.

Regardless of which boot record is selected, once the boot record to be utilized has been identified and the query answered, the process passes to step 410, which illustrates the process becoming idle until the next query from the system BIOS. Since the alternate boot record is only employed after multiple restarts have proved ineffective, the process illustrated in FIG. 4A may be executed several times during the course of self-recovery efforts.

FIG. 4B illustrates the process for initializing the system with either the master boot record or the alternate boot record. The process begins at step 420, which depicts receipt of a signal indicating which boot record is to be employed. The process next passes to step 422, which illustrates the process diverging based on which boot record was specified. If the master boot record was specified, the process proceeds to step 424. Step 424 depicts employing the master boot record, designating the file space in the first portion of the disk as the primary partition, and utilizing the extended boot record in the second portion of the hard disk to define the file space in the second portion as as single logical partition. Under such conditions, the alternate boot record and the extended boot record in the first portion of the hard disk are not seen by the system (treated as unused space).

Referring again to step 422, if the alternate boot record was specified, the process proceeds instead to step 426. Step 426 depicts employing the extended boot record, designating the file space and extended boot record in the first portion of the hard disk as an extended partition, and designating the file space in the second portion of the hard disk as the primary partition. The master boot record and the extended boot record in the second portion of the hard disk are not seen by the system.

The master boot record is not utilized by the system when the alternate boot record is employed to boot the system, and may be repaired by utilities. The master boot record may be repaired by simply resetting the master boot record to the factory settings. Once the master boot record is repaired, the system may restart again utilizing the master boot record. The repair utilities described above would initiate a restart of the system. The system then restarts through steps 402, 404, and 406 depicted in FIG. 4A in conjunction with step 424 depicted in FIG. 4B.

Figure 5:
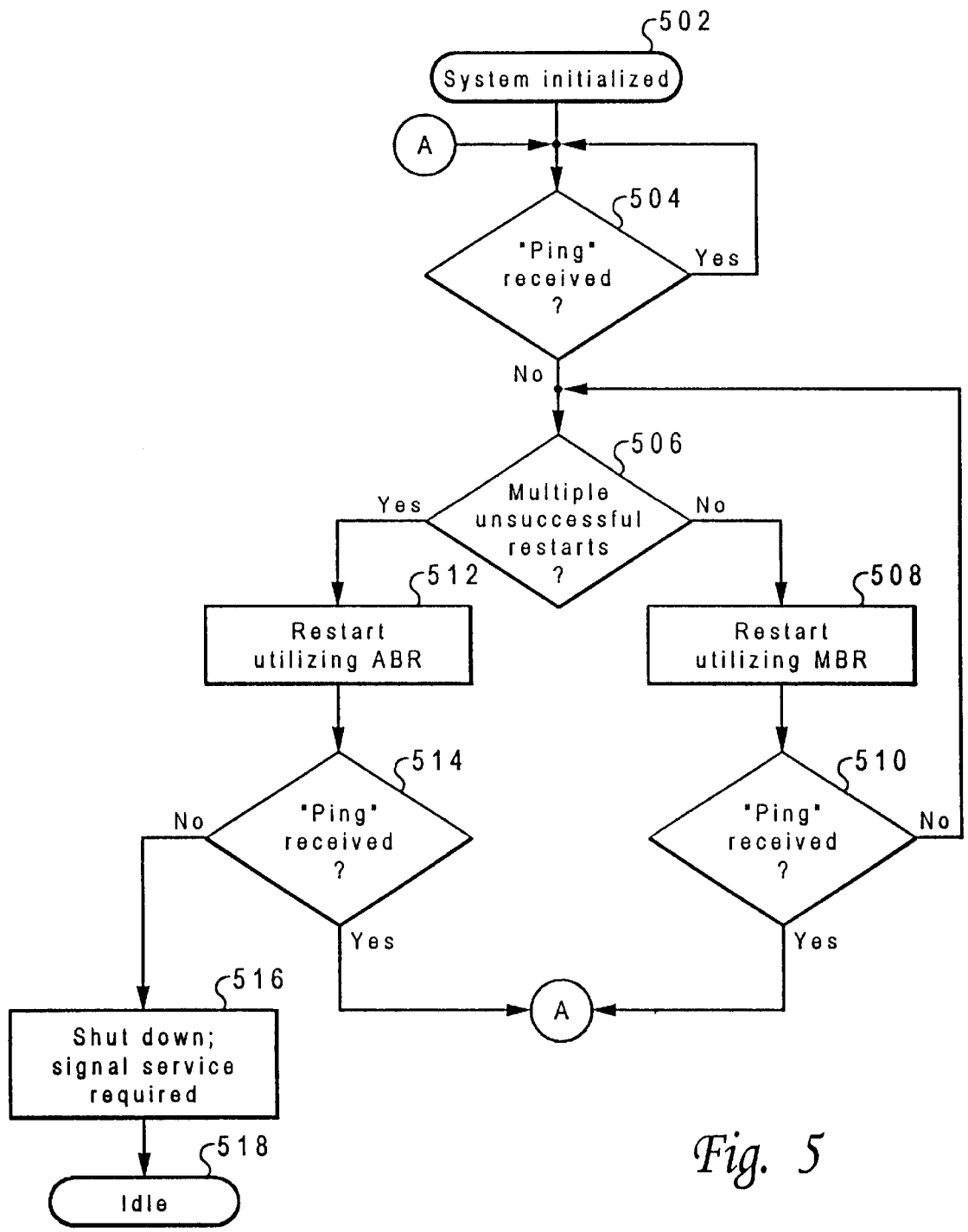
FIG. 5 depicts a high level flowchart for a process for self-recovery in accordance with a preferred embodiment of the present invention.

With reference now to FIG. 5, a high level flowchart for a process for self-recovery in accordance with a preferred embodiment of the present invention is depicted. The process begins at step 502, which illustrates the system completing initialization, and proceeds to step 504, which depicts a periodic determination of whether the system is operating normally, such as by determining whether a "ping" is received from the system during a prescribed timeout period. If the system is operating normally, the process loops back to step 504 and continues polling the system operation.

If the system is not operating normally (i.e.—a ping is not received within the prescribed timeout period), then the process proceeds to step 506. Step 506 illustrates a determination of whether system has unsuccessfully attempted to restart or reinitialize multiple times. If not, the process proceeds to step 508, which depicts an attempt to restart the system utilizing the master boot record. The process then passes to step 510, which illustrates a determination of whether the system successfully restarted, such as by determining whether a ping is received after enough time has elapsed for both the system to reinitialize and a prescribed timeout period pass. If the system reinitialized successfully, the process passes back to step 504 and continues polling the system operation.

If, in step 510, the system is found not to have successfully reinitialized, the process proceeds instead back to step 506 for a determination of whether the unsuccessful attempt to restart was one of several. If so, the process passes to step 512, which depicts an attempt to restart the system utilizing the alternate boot record. The process then passes to step 514, which illustrates a determination of whether the system is operating normally, such as by determining whether a ping was received during a defined period. If so, the process passes back to step 504 and continues polling the operation of the system. Optionally, the process may include a step before proceeding to step 504 in which utilities are started to attempt to repair the master boot record or any other defect located.

If the system is determined not to be operating normally in step 514, the process proceeds instead to step 516, which illustrates the process shutting down the system and signalling that service is required. The process then passes to step 518, which depicts the process becoming idle until the system is repaired and again initialized successfully.

If the first partition becomes corrupt in some way, system may not be able to boot properly. Because the alternate boot data is located at the other extreme physical end of the disk drive from the master boot record, it may be able to reinitialize a system when a defect begins to appear in the other part of the disk drive. This makes the data processing system more like an appliance, capable of self-recovery.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

The capacity of the present invention for self analysis, detecting operational malfunctions, and self-repair, initiating self-recovery where possible and signaling that service is required when self-recovery efforts are unsuccessful, relieves the user of a requirement that a certain level of technical sophistication be acquired to utilize the data processing system. In general, any data processing system may be advantageously equipped with the present invention to improve the simplicity of operation. The present invention may be implemented in such data processing systems with only minor changes to existing, commercially-available operating systems.

The present invention also has application to a variety of other situations. Military and medical systems, which critically require continuous operation with as little interruption as possible, are obvious candidates. The alternate boot record of the present invention may be employed to bring a system back online with minimal interruption of service. In such systems, the second partition may be larger than the first since it may contain utilities for repairing and updating the first partition in addition to a copy of the operating system and a mirror of the data in the first partition.

While the invention has been particularly shown and described with reference to a preferred embodiment, it will be understood by those skilled in the art that various changes in form and detail may be made therein without departing from the spirit and scope of the invention.

What is claimed is:

1. A method of providing alternate boot data in a data processing system, comprising:

storing primary boot data in a first partition on computer usable media in said data processing system at a first physical end of the computer usable media;

storing alternate boot data in a second partition on the computer usable media in the data processing system at a second physical end of the computer usable media;

storing first extended boot data in the second partition, the first extended boot data duplicating a portion of the primary boot data except for a flag indicating whether the first partition contains data for system initialization; and storing second extended boot data in the first partition, the second extended boot data duplicating a portion of the alternate boot data except for a flag indicating whether the second partition contains data for system initialization.

2. An apparatus for providing alternate boot data in a data processing system, comprising:

a first partition on computer usable media containing primary boot data at a first physical end of the computer usable media;

a second partition on the computer usable media containing alternate boot data at a second physical end of the computer usable media, wherein the second partition contains first extended boot data duplicating a portion of the primary boot data except for a flag indicating whether the first partition contains data for system initialization, and wherein the first partition contains second extended boot data duplicating a portion of the alternate boot data except for a flag indicating whether the second partition contains data for system initialization.

3. A method of employing alternate boot data in a data processing system, comprising:

determining whether the data processing system has unsuccessfully attempted to initialize;

responsive to determining that the data processing system has not unsuccessfully attempted to initialize, employing primary boot data located at a first physical end of data storage accessible by the data processing system in a first partition on the data storage to initialize the data processing system and employing first extended boot data located in a second partition on the data storage to initialize the first partition; and responsive to determining that the data processing system has unsuccessfully attempted to initialize, employing alternate boot data located at a second physical end of the data storage accessible by the data processing system in the second partition to initialize the data processing system and employing second extended boot data located in the first partition to initialize the second partition, wherein the data processing system employs alternate boot data to initialize when the primary boot data may not be successfully employed.

4. An apparatus for employing alternate boot data in a data processing system, comprising:

determination means for determining whether the data processing system has unsuccessfully attempted to initialize;

first selection means, responsive to determining that the data processing system has not unsuccessfully attempted to initialize, for employing primary boot data located at a first physical end of data storage accessible by the data processing system in a first partition on the data storage to initialize the data processing system and employing first extended boot data located in a second partition on the data storage to initialize the first partition; and second selection means, responsive to determining that the data processing system has unsuccessfully attempted to initialize, for employing alternate boot data located at a second physical end of the data storage in the second partition to initialize the data processing system and employing second extended boot data located in the first partition to initialize the second partition, wherein the data processing system employs alternate boot data to initialize when primary boot data may not be successfully employed.

5. System initialization data in a data processing system, comprising:

first primary system initialization data including first primary partition initialization data and first operating system software stored on computer readable media accessible by the data processing system in a first partition at a first end of the computer readable media;

second primary system initialization data including second primary partition initialization data and second operating system software stored on the computer readable media in a second partition at a second end of the computer readable media;

first extended partition initialization data stored in the second partition, the first extended partition initialization data duplicating a portion of the second primary partition initialization data except for a flag indicating whether the first partition contains data for system initialization; and second extended partition initialization data stored in the first partition, the second extended partition initialization data duplicating a portion of the first primary partition initialization data except for a flag indicating whether the second partition contains data for system initialization.

6. A computer program product for use with a data processing system, comprising:

a computer usable medium;

primary boot data on a first track in a first partition on the computer usable medium;

alternate boot data on a last track in a second partition on the computer usable medium;

first extended boot data in the second partition, the first extended boot data duplicating a portion of the primary boot data except for a flag indicating whether the first partition contains data for system initialization; and second extended boot data in the first partition, the second extended boot data duplicating a portion of the alternate boot data except for a flag indicating whether the second partition contains data for system initialization.

7. The computer program product of claim 6, wherein the computer usable medium is a hard disk drive.

8. The computer program product of claim 6, wherein the computer usable medium is a floppy disk.

9. The computer program product of claim 6, wherein the computer usable medium is a CD-ROM.

10. A method in a data processing system for automatically reinitializing the data processing system, comprising:

monitoring a periodic signal in the data processing system indicating normal operation; and responsive to a cessation of the periodic signal,
automatically restarting the data processing system,
initializing the data processing system and a first partition at a first end of data storage accessible to the data processing system using a primary boot record within the first partition, and
initializing a second partition at a second end of the data storage utilizing a first extended boot record within the first partition, the first extended boot record duplicating a portion of a secondary boot record in the second partition except for a flag indicating whether the second partition contains data for system initialization;

responsive to the data processing system failing to initialize using the primary boot record,
automatically restarting the data processing system,
initializing the data processing system and the second partition using the secondary boot record, and
initializing the first partition using a second extended boot record within the second partition, the second extended boot record duplicating a portion of the primary boot record except for a flag indicating whether the first partition contains data for system initialization, wherein the data processing automatically recovers from system errors without user intervention.

11. The method of claim 10, further comprising:

subsequent to the initializing the data processing system using a secondary boot record, executing a utility application repairing the primary boot record.

12. The method of claim 11, further comprising:

subsequent to executing a utility application repairing the primary boot record, automatically restarting the data processing system and initializing the data processing system using a secondary boot record.

* * * * *